United States Patent [19]

McDonagh

[11] 4,169,180
[45] Sep. 25, 1979

[54] RESIN LAMINATE HAVING PROTECTIVE LAYER

[75] Inventor: John M. McDonagh, Wilton, Conn.

[73] Assignee: Stauffer Chemical Company, Westport, Conn.

[21] Appl. No.: 833,855

[22] Filed: Sep. 16, 1977

[51] Int. Cl.² ............... B32B 27/30; B32B 27/08
[52] U.S. Cl. ............... 428/215; 52/309.1; 52/DIG. 7; 428/220; 428/520; 428/522; 428/911
[58] Field of Search ............... 52/DIG. 7, 309.1; 428/215, 220, 911, 500, 515, 520, 522

[56] References Cited

U.S. PATENT DOCUMENTS

| | | | |
|---|---|---|---|
| 2,802,809 | 8/1957 | Hayes | 260/45.5 |
| 3,421,971 | 1/1969 | Kamal et al. | 428/522 X |
| 3,616,136 | 10/1971 | Endrenyl | 428/500 X |
| 3,802,912 | 4/1974 | Otocka | 428/500 X |
| 3,804,705 | 4/1974 | Kishikawa et al. | 428/442 |
| 3,944,631 | 3/1976 | Yu et al. | 260/881 |
| 3,997,704 | 12/1976 | Aurichio | 428/500 |
| 4,064,314 | 12/1977 | McKenzie | 428/522 X |
| 4,126,594 | 11/1978 | Peters et al. | 428/500 X |

OTHER PUBLICATIONS

European Plastics News, Mar. 1977, Styrene Plastics, ABS, pp. 21 & 24-26.
Modern Plastics, Jun. 1976, Vinyl Dresses Up for New Era in Siding, pp. 34-37.
Modern Plastics, Jun. 1976, Korad Acrylic Film, p. 8.
Modern Plastics, Jun. 1977, Korad Acrylic Film, p. 147.

Primary Examiner—Harold Ansher
Attorney, Agent, or Firm—Richard P. Fennelly

[57] ABSTRACT

A laminate which is useful as a construction material is disclosed. It comprises: (1) a base layer of a synthetic resin having inferior weather-proof characteristics; and (2) a protective layer of a crosslinked acrylate and/or methacrylate/crosslinked styrene-acrylonitrile/uncrosslinked styrene-acrylonitrile polymer composition attached to the base layer. The laminate can be used as a material for siding, gutter systems, downspouts, soffit and fascia systems, shutters, window casings and the like.

10 Claims, No Drawings

RESIN LAMINATE HAVING PROTECTIVE LAYER

BACKGROUND OF THE INVENTION

1. Field of the Invention

The present invention relates to a laminate which is useful as an outdoor construction material.

2. Description of the Prior Art

The use of various types of synthetic resins or polymers, for example, polyvinyl chloride, to form construction materials, for example, residential siding, is known (Canadian Pat. No. 996,329). In some cases the effects of possible deterioration of such materials, due to weathering when placed in service, has been solved by the incorporation of either inorganic stabilizers (Plastics Technology, February 1976, pp. 15-17) or certain weather resistant copolymer additives in the synthetic resin or polymer (U.S. Pat. No. 2,802,809 to R. A. Hayes).

Another prior art approach to solving the problem of deterioration of the polymeric material has been the provision of a layer of another polymer composition to protect the substrate resin or polymer from deterioration due to environmental effects. Thus, it has been proposed that various laminates be formed wherein the substrate is either a substantially rigid polyvinyl chloride resin or a chlorinated polyvinyl chloride resin, and the protective layer is either a heavily pigmented and stabilized polyvinyl chloride resin composition or a weatherable acrylic resin (Modern Plastics, June 1976, pp. 8 and 34-37). One recently developed laminate of this type comprises a layer of a normally weatherable synthetic resin and a protective layer of an acrylic resin incorporated with an ethylene/vinyl acetate copolymer-vinyl chloride graft copolymer (U.S. Pat. No. 3,804,705 to H. Kishikawa).

SUMMARY OF THE INVENTION

The present invention is a laminate which is suitable for use as an outdoor construction material which comprises: (1) a base layer of a synthetic resin which is normally adversely affected by weathering upon outdoor exposure if used alone; and (2) a protective layer of a crosslinked acrylate and/or methacrylate (hereinafter designated "(meth)acrylate")/crosslinked styrene-acrylonitrile/uncrosslinked styrene-acrylonitrile polymer composition attached to the base layer to confer improved weather resistance, impact resistance and heat distortion temperature on the laminate as compared to use of the base layer alone.

DESCRIPTION OF THE INVENTION

The present invention is a laminate which is useful as an outdoor construction material, for example, as a material for siding, gutter systems, downspouts, soffit and fascia systems, shutters, window casings and the like, which comprises: (1) a base layer of a synthetic resin which has inferior weatherproof characteristics and is normally adversely affected by weathering upon outdoor exposure; and (2) a crosslinked (meth)acrylate/crosslinked styrene-acrylonitrile/uncrosslinked styrene-acrylonitrile composition as a protective top layer.

The terminology "synthetic resin having inferior weatherproof characteristics" is intended to encompass those synthetic resins having the necessary strength to be used as outdoor construction materials which, nevertheless, undergo deterioration in their mechanical properties or discoloration when used outdoors and subjected to ultraviolet light and environmental degradation. Examples of such resins include: acrylonitrile-butadiene-styrene (ABS), methyl methacrylate-butadiene-styrene (MBS), high impact polystyrene (HIPS), polypropylene (PP), polyvinyl chloride (PVC), and chlorinated polyvinyl chloride (CPVC).

The terminology "crosslinked (meth)acrylate/crosslinked styrene-acrylonitrile/uncrosslinked styrene-acrylonitrile polymer composition" is to be understood as referring to the type of polymer composition described in U.S. Pat. No. 3,944,631 to A. J. Yu et al. Such a composition can be formed by the following three step sequential polymerization:

1. emulsion polymerizing a monomer charge of at least one $C_2$–$C_{10}$ alkyl acrylate, $C_8$–$C_{22}$ alkyl methacrylate, or compatible mixtures thereof, in an aqueous polymerizaton medium in the presence of an effective amount of a suitable di- or polyethylenically unsaturated crosslinking agent for such a monomer. The $C_4$–$C_8$ alkyl acrylates are the preferred (meth)acrylate monomers for use in this step;

2. emulsion polymerizing a monomer charge of styrene and acrylonitrile in an aqueous polymerization medium also in the presence of an effective amount of a suitable di- or polyethylenically unsaturated crosslinking agent for such a monomer. This procedure is carried out in the presence of the product from Step 1 so that the crosslinked (meth)acrylate and crosslinked styrene-acrylonitrile form an interpolymer wherein the respective phases surround and penetrate one another; and 3. either emulsion or suspension polymerizing a monomer charge of styrene and acrylonitrile in the absence of crosslinking agent in the presence of the product resulting frm Step 2. If desired, Steps 1 and 2 can be reversed in the above-described procedure.

This product, which is used as the protective layer in the laminate of the present invention, comprises from about 10% to about 50%, by weight, of the above-identified crosslinked (meth)- acrylates, from about 5% to about 35%, by weight, of crosslinked styrene-acrylonitrile and from about 15% to about 85%, by weight, of uncrosslinked (or "linear") styrene-acrylonitrile. It contains little graft polymerization between the styrene-acrylonitrile copolymer segments and the crosslinked (meth)acrylate component. It has a melting point of from about 390° F. (199° C.) to about 450° F. (232.3° C.). Further details regarding this type of polymer composition can be found in U.S. Pat. No. 3,944,631 to A. J. Yu et al., which is incorporated herein by reference.

The laminates of the present invention contain a base layer of the synthetic resin (optionally, comprising at least one additive selected from the conventional lubricants, stabilizers, impact modifiers, fillers, flame retardants, processing aids and the like) which is sufficient in thickness to confer the desired degree of strength upon the construction material which is intended. The protective layer is also sufficient in thickness to confer the desired degree of protection from environmental degradation and to confer improved impact resistance and heat distortion temperature characteristics on the laminate as compared to the base resin alone. For vinyl siding, the thickness of the base layer of synthetic resin can range from about 0.01 in. (0.254 mm.) to about 0.10 in. (2.54 mm.), preferably from about 0.03 in. (0.762 mm.) to about 0.04 in. (1.016 mm.), with the protective layer being from about 0.001 in. (0.025 mm.) to about 0.050 in. (1.27 mm.), preferably from about 0.003 in. (0.076 mm.) to about 0.010 in. (0.254 mm.).

However, if desired, the thicknesses of both layers can be increased above the values given for representative vinyl siding materials. For example, thicknesses of up to about 0.5 in. (12.7 mm.) for both layers are useful as outdoor construction materials. However, it is economically attractive to reduce the thickness of the layers as much as possible, provided the desired physical properties of the resulting laminate are not adversely affected.

The protective layer, as mentioned briefly above, will improve one or more of the following properties: impact resistance, heat distortion temperature and ultraviolet resistance of the laminate. Each of these can be important effects. Improved impact resistance will produce a lessened chance of fracture in the event a foreign object strikes the material. Improved ultraviolet light resistance allows for the use of darker colors than conventionally used in construction materials only containing the base resin since such improved resistance retards the fading of such darker colors in the laminate of the present invention. Improved heat distortion temperature is of importance because use of such darker colors will lead to the absorption of more heat. The greater retention of strength for the laminates of the present invention prevents this sagging of the laminates as compared to construction materials only containing the base resin.

The laminates of the present invention may be made by a number of conventional fabrication techniques known to persons of ordinary skill in the art including: coextrusion via dual dies and extruders, either concurrently or separately, followed by lamination with heat and pressure; coextrusion in a single die wherein the lamination occurs in the die; simple hot lamination of a layer of the protective composition to the base layer of synthetic resin; or lamination of the base layer and protective layer with the use of a suitable compatible binding agent, such as an ethylene:vinyl acetate copolymer as described in U.S. Pat. No. 3,804,705 to H. Kishikawa.

EXAMPLE 1

This Example illustrates the improved heat distortion temperature (hereinafter "DTL") for a series of laminates of the present invention as compared to an article formed of a base layer of synthetic resin (PVC) alone. The DTL is that temperature at which the laminates deflected 0.010 in. (0.254 mm.) under a load of 264 lbs./in.$^2$ (772.6 kg./cm.$^2$).

A series of polyvinyl chloride formulations were made for the base layer by mixing the ingredients listed below until a homogeneous blend was obtained. All amounts are given in parts by weight:

| Ingredient | Formulation Nos. | | | |
|---|---|---|---|---|
| | 1 | 2 | 3 | 4 |
| Polyvinyl chloride homopolymer[1] | 160 | 160 | 160 | 160 |
| TiO$_2$ filler | — | 3.0 | 3.0 | 3.0 |
| Impact modifier[2] | — | 37.5 | — | 30.0 |
| Tin mercaptan stabilizer ("Thermolite 31, from M and T Chemical) | 4.5 | 4.5 | 4.5 | 4.5 |
| Carnauba wax lubricant ("Wax E", from Hoescht Chemical) | 1.5 | 1.5 | 1.5 | 1.5 |

[1] a medium molecular weight homopolymer of polyvinyl chloride, available as SCC-616 from Stauffer Chemical Company, Plastics Division.
[2] a suspension emulsion interpolymer formed in accordance with U.S. Pat. No. 3,832,318 to Ruth E. Gallagher et al. It contains a crosslinked butyl acrylate emulsion polymer overpolymerized with suspension polymerized polyvinyl chloride.

Each of the polyvinyl chloride formulations were hot pressed at about 370° F. (187.8° C.) (either with or without a protective layer, as described below) into a suitable laminate or article (in the case of the PVC control) having a thickness of about 0.125 in. (3.13 mm.). Formulation No. 1 represents the control of synthetic base resin alone. Formulation Nos. 2–4 were each laminated to two layers (of differing thickness) of applicant's desired protective resin. The DTL of the control and the laminates was then determined. In the Table given below the figures in parenthesis give the approximate percentage thickness of protective resin layer (before the slash) and of the base layer of PVC (after the slash) for each article that was formed. The numbers used below indicate the particular formulation described above, that was used in the article as the base layer.

| Article No. | DTL (°C.) |
|---|---|
| 1 (0/100) | 69 |
| 2 (25/75) | 70 |
| 2 (10/90) | 82 |
| 3 (50/50) | 74 |
| 3 (25/75) | 75 |
| 4 (75/25) | 69.5 |
| 4 (80/20) | 73 |

These data indicate that applicant's desired protective resin is effective in raising the DTL of laminates containing a base layer of synthetic resin even if the base resin contains an impact modifier which will generally depress the DTL of such a resin. If an impact modifier is used, the thickness of the protective resin which is used may have to be greater than would be used in a non-impact modified base resin formulation.

EXAMPLE 2

In this Example a series of laminates in accordance with the present invention were made using a higher molecular weight homopolymer of polyvinyl chloride (PVC) than used in Example 1. The PVC formulation for the base layer was made by mixing the ingredients listed below until a homogeneous blend was obtained. All amounts are given in parts by weight.

| Ingredient | Amount |
|---|---|
| PVC homopolymer[1] | 160 |
| Tin mercaptan stabilizer ("Thermolite 31" from M and T Chemical) | 4.5 |
| Carnauba wax lubricant ("Wax E", from Hoechst Chemical) | 1.5 |

[1] a high molecular weight homopolymer of PVC, available from Stauffer Chemical Company, Plastics Division.

The same general procedure was used to form and test both the control article of PVC alone and a series of laminates having differing thickness values. The DTL values of each are given below. The laminates are described as "PVC/PR" laminates, with "PR" standing for applicant's desired protective layer.

| Article | Thickness (mm.) | DTL °C. |
|---|---|---|
| PVC (Control) | 3.05 | 68.9 |
| PVC/PR | 1.48/0.25 | 71.1 |
| PVC/PR | 3.05/1.02 | 73.9 |

This data demonstrates the increased DTL values for laminates of the present invention having total thicknesses both less than and greater than an article of PVC resin alone.

The foregoing Examples are intended to be merely illustrative of applicant's invention and should not be construed in a limiting sense. The scope of protection which is sought is set forth in the claims which follow.

What is claimed:

1. A laminate suitable for use as an outdoor construction material which comprises:
   (1) a base layer of a synthetic resin which is normally adversely affected by weathering upon outdoor exposure if used alone; and
   (2) a protective layer of a crosslinked (meth)acrylate/crosslinked styrene-acrylonitrile/uncrosslinked styrene-acrylonitrile polymer composition attached to the base layer to confer improved weather resistance, impact resistance and heat distortion temperature on the laminate.

2. A laminate as claimed in claim 1 wherein the synthetic resin is selected from the group consisting of acrylonitrile-butadiene-styrene, methyl methacrylate-butadiene-styrene, high impact polystyrene, polypropylene, polyvinyl chloride and chlorinated polyvinyl chloride.

3. A laminate as claimed in claim 1 wherein the synthetic resin is polyvinyl chloride.

4. A laminate as claimed in claim 1 wherein the protective layer comprises from about 10% to about 50%, by weight, of the (meth)acrylate component, from about 5% to about 35%, by weight, of the crosslinked styrene-acrylonitrile component and from about 15% to about 85%, by weight of the uncrosslinked styrene-acrylonitrile component.

5. A laminate as claimed in claim 1 wherein the base layer has a thickness of from about 0.01 in. to about 0.10 in.

6. A laminate as claimed in claim 1 wherein the protective layer has a thickness of from about 0.001 in. to about 0.050 in.

7. A laminate as claimed in claim 4 wherein the synthetic resin is polyvinyl chloride.

8. A laminate as claimed in claim 7 wherein the base layer has a thickness of from about 0.01 in. to about 0.10 in.

9. A laminate as claimed in claim 8 wherein the protective layer has a thickness of from about 0.001 in. to about 0.050 in.

10. A laminate as claimed in claim 4 wherein the synthetic resin is polyvinyl chloride, the base layer has a thickness of from about 0.03 in. to about 0.04 in., and the protective layer has a thickness of from about 0.003 in. to about 0.010 in.

* * * * *